(12) United States Patent
Sorensen (10) Patent No.: US 9,281,726 B2
(45) Date of Patent: Mar. 8, 2016

(54) ACTUATOR

(75) Inventor: Claus H. Sorensen, Nordborg (DK)

(73) Assignee: Linak A/S, Nordborg (DK)

( * ) Notice: Subject to any disclaimer, the term of this patent is extended or adjusted under 35 U.S.C. 154(b) by 261 days.

(21) Appl. No.: 14/123,407

(22) PCT Filed: May 31, 2012

(86) PCT No.: PCT/DK2012/000062
§ 371 (c)(1),
(2), (4) Date: Dec. 2, 2013

(87) PCT Pub. No.: WO2012/163354
PCT Pub. Date: Dec. 6, 2012

(65) Prior Publication Data
US 2014/0124344 A1    May 8, 2014

(30) Foreign Application Priority Data
May 31, 2011  (DK) ................................ 2011 00411

(51) Int. Cl.
*H01H 3/58*   (2006.01)
*H01H 3/30*   (2006.01)
*H02K 7/116*  (2006.01)
*H01H 3/26*   (2006.01)
*H01H 3/22*   (2006.01)

(52) U.S. Cl.
CPC ................ *H02K 7/116* (2013.01); *H01H 3/26* (2013.01); *H01H 3/58* (2013.01); *H01H 3/227* (2013.01); *H01H 2003/266* (2013.01)

(58) Field of Classification Search
CPC ........... H01H 3/22; H01H 3/227; H01H 3/26; H01H 3/58; H02K 7/116

USPC ......... 200/331, 400, 501, 17 R, 18, 605, 627, 200/631; 361/605, 606, 627, 631, 632, 640, 361/643, 647
See application file for complete search history.

(56) References Cited

U.S. PATENT DOCUMENTS 4,804,809 A    2/1989   Thompson et al.
5,254,814 A   10/1993   Harr
(Continued)

FOREIGN PATENT DOCUMENTS

FR           683538      6/1930
WO         97/16660      5/1997
WO      2006/106364     10/2006

*Primary Examiner* — Amy Cohen Johnson
*Assistant Examiner* — Marina Fishman
(74) *Attorney, Agent, or Firm* — Dykema Gossett PLLC (57) ABSTRACT

The invention relates to an actuator for operating a positioning element. A common requirement in such actuators is that the positioning element can be decoupled from the electric motor that drives the positioning element via a transmission. In some applications the actuators are so compact that the only way to decouple the actuator is to disassemble parts of the actuator. To connect the positioning element to the electric motor again, this however requires that the whole actuator is demounted so as to ensure that the disassembled parts are properly assembled. The present invention overcomes this problem by providing an actuator comprising two toothed wheels which by mutual displacement can be brought out of mesh and which each comprises at least two toothed rims positioned with a spacing corresponding to at least the width of one toothed rim. Hence the provided actuator is very compact in that the space required for disengagement of the positioning element is practically reduced to the width of the toothed wheels. Further the construction ensures a firm mesh, making the actuator highly reliable.

10 Claims, 7 Drawing Sheets

(56) References Cited

U.S. PATENT DOCUMENTS

| | | | |
|---|---|---|---|
| 5,895,987 A * | 4/1999 | Lo et al. | H01H 3/227 200/50.26 |
| 8,129,644 B2 * | 3/2012 | Christensen | H01H 3/26 200/501 |
| 8,139,345 B2 * | 3/2012 | Christensen | H01H 3/227 200/17 R |
| 2009/0314615 A1 | 12/2009 | Christensen et al. | |
| 2010/0046146 A1 | 2/2010 | Christensen et al. | |
| 2011/0192707 A1 | 8/2011 | Sørensen | |

\* cited by examiner

ACTUATOR

BACKGROUND OF THE INVENTION

1. Field of the Invention

The invention relates to an actuator as stated in the preamble of claim 1 for operating a positioning element.

Actuators are used in furniture, hospital beds, patient lifts etc. Actuators have also found their way into the industrial sector, where they for example are applied in manufacturing equipment and solar panels. In a particular embodiment, the actuators are designed as motor operators for operating switchgears used in mains power distribution systems. The invention thus further relates to an actuator embodied as a motor operator as stated in the preamble of claim 2 for opening and closing a mains switch of switchgear in mains power distribution systems such as public medium high voltage distribution systems.

2. Description of the Prior Art

Actuators embodied as motor operators for switchgears are known, see e.g. U.S. Pat. No. 4,804,809 to Chance Co. AB, U.S. Pat. No. 5,254,814 to Chance Co. AB, WO 2008/052548 A1 to Linak A/S and WO 2006/106364 to Viserge Ltd. These motor operators are separate units for mounting in front of switchgears as indicated in U.S. Pat. No. 4,804,809 to Chance Co. AB and WO 2006/106364 to Viserge Ltd. The motor operators are contained in a weather and vandal proof enclosure which is rather voluminous. Further, it should be fully operable under all weather conditions and operate in a reliable manner. The front surface of the switchgear is exposed to the open air which is why the overall size of the motor operator is of no significant importance. However, a type of switchgear is also known where the front surface is covered by a front door to protect the front surface of the switchgear and to prevent unauthorized access to the switchgear. The front door restricts the space available for a motor operator and further complicates the mounting as it is prohibited to make bores and weldings in the switchgear cabinet.

It should also be taken into account that the motor operator may be activated either locally or remotely to open and close the mains switch of the switchgear. In some cases there could be a need to perform a manual operation of the switchgear. This could be in case of a failure, damage or breakage of the transmission line (e.g. cables) in the supply network for example due to excavations. It could also be in case of a faulty motor operator, or when service personnel on site wishes to manually operate the switchgear and perform service on the transmission line. In that case the transmission line has to be connected to the earth potential by operating the earth switch of the switchgear. In many types of switchgears, this action can only be performed when the switchgear state is open and the handle tool for the mains switch is pulled out. This means that the motor operator will have to demount from the switchgear. For operating the switchgear operating shaft, a spring has to be suppressed, before the power of the spring is released in the transition operation of the mains switch. Removing the motor operator when the spring is not in its relaxed state will be a difficult task and could lead to a sudden release of the spring and cause a rotation of the operating shaft and should be avoided. It is therefore common to use motor operators, where the self-locking mechanism of the motor operator can be released. This also complicates the construction of the motor operator and contributes to the overall size. Such rather voluminous type of switchgear is found in WO 97/16660 to ABB Kraft A/S disclosing a worm gear based power transmission device having a spring based disengagement mechanism, whereby the device when not driven by a motor may be manually operated. However, this device constitutes a rather bulky construction, which is difficult to retrofit. Consequently, the device is also difficult to dismount so as to allow manual operation of the switchgear.

Another worm gear based motor operator having smaller dimensions is disclosed in WO 2010/034313 A2 to Linak A/S. Its small size and the fact that the operator unit and the motor driving the unit are two separate units make it very easy to retrofit. This motor operator can be manually operated, first by loosening a retainer element whereby the worm gear is released and secondly by dismounting the operator unit. Remounting the operator unit and reconnecting it is, however, a time-consuming and cumbersome task. Further, by loosening the retainer element a number of balls are brought out of engagement with the worm wheel, whereby the worm wheel is released. After release, the retainer element cannot simply be tightened again as the balls need to be rearranged in a corresponding number of holes in the worm wheel. This may therefore require that the motor operator is serviced by authorized personnel. This could therefore further increase the downtime of the switchgear. When remounting the motor operator, it could be problematic to align the position of the coupling part of the motor operator and the position of the operating shaft of the switchgear. Hence, there is a need for a motor operator which overcomes these problems associated with the known motor operators.

It is an object of the present invention is to provide a motor operator for use in a switchgear having small dimensions, low costs, and which in a simple, reliable and quick manner may be disconnected so as to allow manual operation of the switchgear.

SUMMARY OF THE INVENTION

According to the invention this is accomplished in that an actuator having a positioning element driven by an electric motor via a transmission comprises two toothed wheels, which by mutual displacement can be brought out of mesh with each other for disengagement of the positioning element. The two toothed wheels each comprise at least two toothed rims positioned with a spacing corresponding to at least the width of a toothed rim. The actuator is very compact in that the space required for disengagement of the positioning element is practically reduced to the width of the toothed wheels. Further, the construction ensures a firm mesh, making the actuator highly reliable.

In a configuration the actuator is embodied as a motor operator for switchgear for mains power distribution systems, where the switchgear comprises a cabinet with at least one operating shaft for at least one mains switch located inside the cabinet. The operating shaft has a coupling part accessible from a front surface of the cabinet and the operating shaft is rotatable between at least two positions namely corresponding to a closed and an open position of the mains switch. The motor operator comprises a housing with a front surface and rear surface and side surfaces connecting the front and rear surfaces. The positioning element of the actuator is embodied as a rotatable adaptor with a first and second end, where the first end is intended for engagement with the coupling part of the operating shaft of the switchgear. The adaptor is arranged in an opening in the front surface of the housing. The motor operator further comprises an electric motor. In this embodiment of the actuator, the toothed wheels of the transmission comprise a first toothed wheel for driving the adaptor and a second toothed wheel in mesh with the first toothed wheel. The second toothed wheel is in driving connection with the electric motor. The first toothed wheel can be displaced relative to the second toothed wheel or vice versa, such that the first wheel is pulled out of mesh with the second toothed wheel, whereby the driving connection with the electric motor is interrupted. This actuator embodied as a motor operator is very compact, making it highly suitable for operating the mains switch of a switchgear. The simplicity of the construction of the toothed wheels and their connection with the adaptor provides a highly reliable solution to the outlined problems.

In an embodiment, the toothing on the two tooted rims is uniformly distributed and comprises a rectilinear face. Hereby, the two toothed wheels may be mutually displaced by a simple unidirectional movement.

In an embodiment of the actuator, at least one toothed wheel of the transmission is in engagement with a release part, which, when turned, may be displaced between a first position and a second position. This is achieved by providing the release part with at least one protrusion engaging with at least one guide of a fixing ring, where each end of the guide has a resting portion corresponding to the first and the second position, respectively. By turning the release part, the adaptor can be disconnected from the electric motor. If the actuator is embodied as a motor operator this will allow a manual operation of the switchgear either by using the adaptor or by removing the adaptor and thereby gain direct access to the operating shaft of the switchgear.

In an embodiment the actuator comprises at least one spring arranged between the first toothed wheel and the second toothed wheel, such that the first toothed wheel is spring loaded relative to the second toothed wheel. The spring will assist in bringing the first and second toothed wheels securely into mesh, if they have been displaced relative to each other.

The release part can be coupled to a detection device for detecting the position of the release part relative to the fixing ring. Hereby, it can be registered whether or not the two toothed wheels are in mesh.

Conveniently, the motor operator will be equipped with a locking device for securing and registering whether or not the adaptor has been inserted and whether the adaptor has been correctly inserted. A receiver for receiving the signal is connected to a control box for monitoring the state of operation of the switchgear.

The transmission of the actuator may be designed as a worm gear, having a worm and a worm wheel. Worm gears are known to be highly reliable and self-locking by nature.

In an embodiment the actuator comprises a sensor for determining the angle of rotation of the first toothed wheel for driving the positioning element. If the actuator is embodied as a motor operator and the positioning element as an adaptor, the information regarding the rotation angle of the adaptor can be logged together with the information regarding the switching transition of the mains switch and later be used to determine the position of the mains switch. It is expedient to use a sensor to determine the angle of the adaptor and thus also the operating shaft of the mains switch. A switching transition is accomplished at different angles varying from switchgear to switchgear, not only in terms of different manufactures, but also in terms of the same type and brand. A procedure of convenience when equipping and installing a motor operator on a switchgear will be to perform a learning session, where as a first action the motor operator will force the mains switch from an open to a closed state, and accordingly store information about the angle at which the switching transition occurs. After that, a second action must be performed using the motor operator to force the mains switch from the closed state and back to the open state, and accordingly store information about the angle at which the switching transition occurs. From the stored angles it is possible to map at least three different angle scales that picture the mains switches in the open state, the mains switches in the closed state and an indeterminate state between the two well-defined states where the motor operator is performing a switching transition of the switchgear. If the angle measurement stays within the scale in which the state of the switchgear is not defined for a long period of time, an alarm should be issued, since it could indicate a possible failure of the motor operator. Expediently, the control could maintain a log of the last known stable connection to indicate the state of the switchgear in case of a faulty motor operator.

Equipping or connecting the motor operator with a sensor for detecting earthing mode will be an advantage since the state of the switchgear can then be monitored remotely via the control system. For more information on a control and surveying system for a switchgear reference is made to WO 2008/052550 A1 to Linak A/S. The procedures and features related to controlling the motor operator described in this document will be understood to be possible to implement and carry out in a control unit as referred to. Also the angle detection and stored set points and automated processes are understood to be carried out by the control.

Further, the system as described is advantageous since it can be mounted retrofit, nonintrusive on a switchgear by using mounting brackets fitted on the outer framework of the switchgear or on already present and available mounting parts of the switchgear housing. Reference is made to WO 2008/052549 A1 Linak A/S for more information as how to mount a motor operator retrofit nonintrusive on a switchgear.

An embodiment of the invention will be described in the following with reference to the accompanying drawing.

DETAILED DESCRIPTION OF THE DRAWINGS

Figure 1:
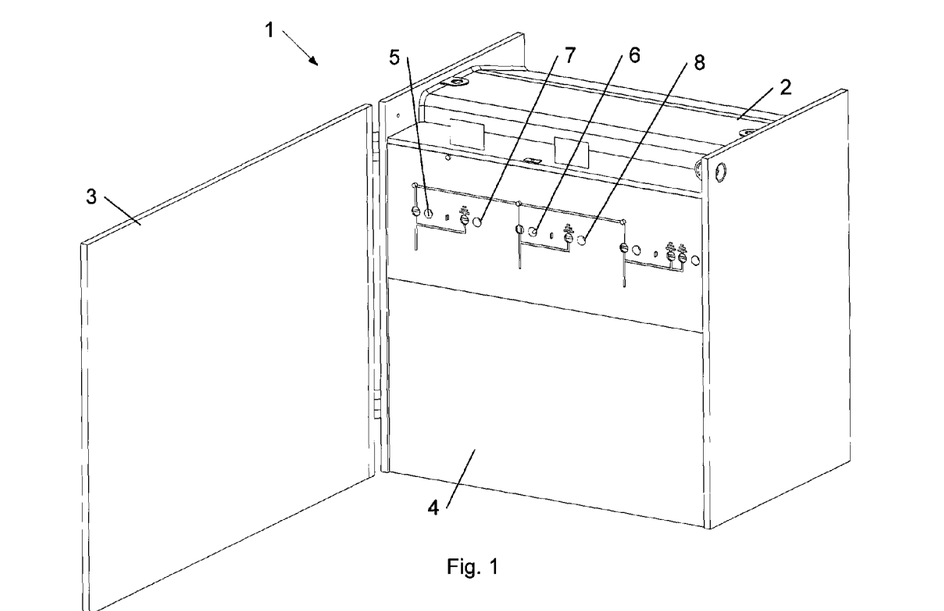
FIG. 1 shows a perspective view of a top, front part of a first type of switchgear.

In FIG. 1 is shown a perspective of a first embodiment of a switchgear 1 comprising a closed cabinet 2 inside which is located two sets of mains switches. In front of the cabinet 2 there is a hinged door 3 covering a front surface 4 of the cabinet 2. Each mains switch has an operating shaft with a coupling part (not shown) accessible through holes 5,6 on the front surface 4 of the cabinet. The operating shaft could be operated manually by a wrench (not illustrated) having an end designed as a coupling part (not illustrated) for engagement with the coupling part of the operating shaft. When the mains switch is in an open position it is possible to earthen the switchgear. The operating shaft for the earthing has a coupling identical to the operating shaft for the mains switch so that the wrench could be used for the earthing. For security reasons the earthing should always be performed manually. The operating shaft for the earthing could be reached through the holes 7,8.

Figure 2:
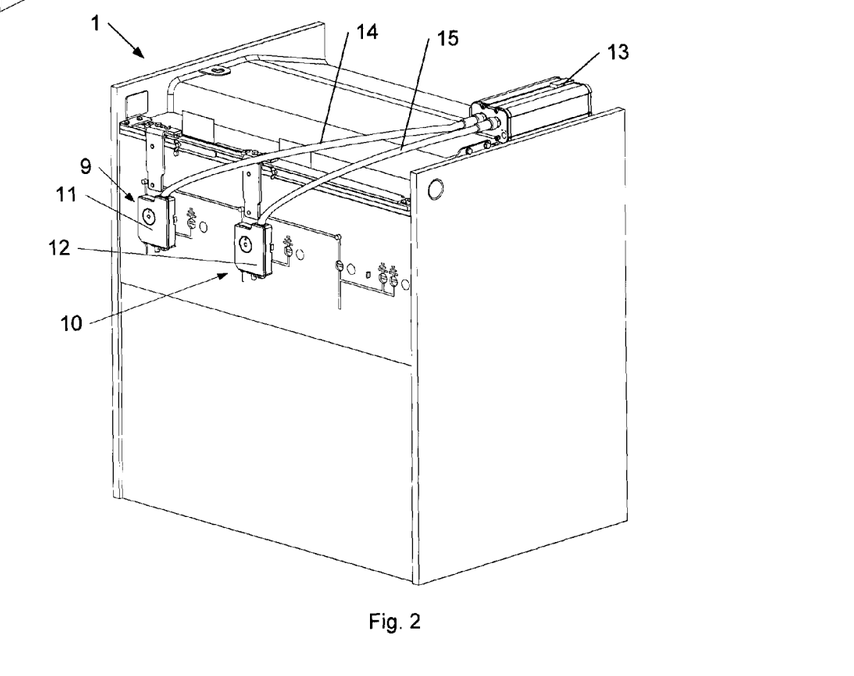
FIG. 2 shows the switchgear in FIG. 1 equipped with motor operators.

As illustrated in FIG. 2 the operating shaft for the mains switches of the switch gear 1 could be operated by motor operators 9,10 each comprising a housing 11,12 mounted on the switchgear 1. Further, the motor operators comprise electric motors located remotely in a separate control box 13 on top of the switchgear cabinet 2. Flexible connection shafts 14,15 interconnects the electric motors (in the separate control box 13) and the motor operators 9,10. The flexible connection shafts 14,15 are connected to the worm (not shown) of a worm gear in the motor operator 9,10. The worm wheels (nor shown) of the worm gear have a though hole, in which positioning elements (not shown) can be fitted. The positioning elements engage with the operating shaft for the mains switches of the switchgear 1. When the electric motors are operated the positioning elements will, via the flexible connection shafts 14,15 and the worm gear of the motor operators 9,10, be turned and thus be able to switch the mains switches of the switchgear 1.

Figure 3:
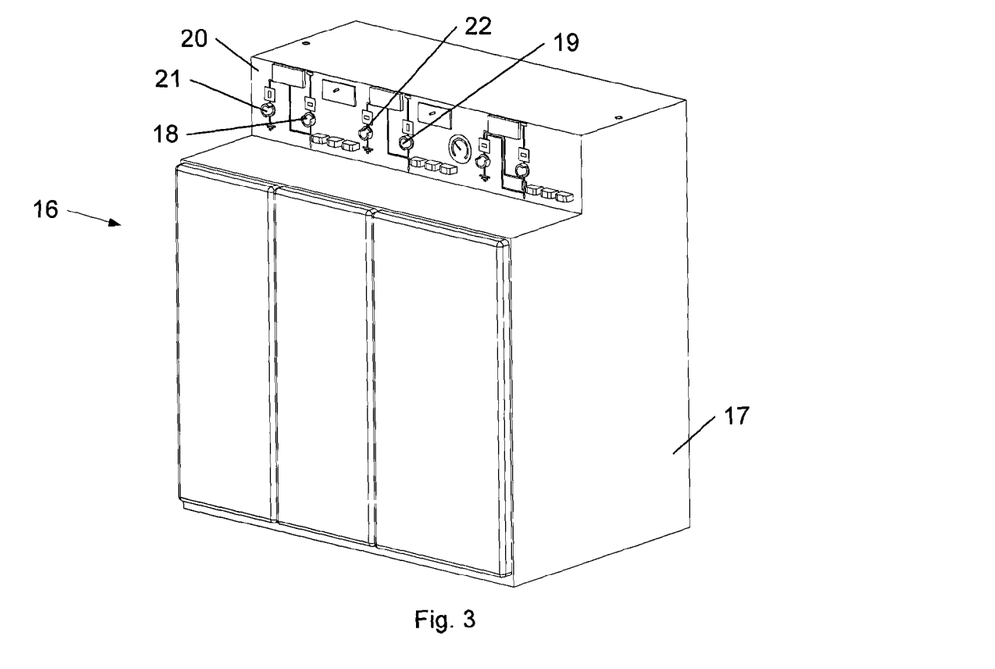
FIG. 3 shows a perspective view of a top, front part of a second type of switchgear.

FIG. 3 shows a perspective of a second embodiment of a switchgear 16 comprising a closed cabinet 17 inside which is located two sets of mains switches (not shown). Each mains switch has an operating shaft with a coupling part 18,19 accessible on the upper front surface 20 of the cabinet 17. The operating shaft could be operated manually by a wrench (not illustrated) having an end designed as a coupling part for engagement with the coupling part 18,19 of the operating shaft. When the mains switch is in an open position it is possible to earthen the switchgear. The operating shaft for the earthing has an identical coupling part 21,22 as the operating shaft for the mains switch so the wrench could be used for the earthing. For security reasons the earthing should always be performed manually.

Figure 4:
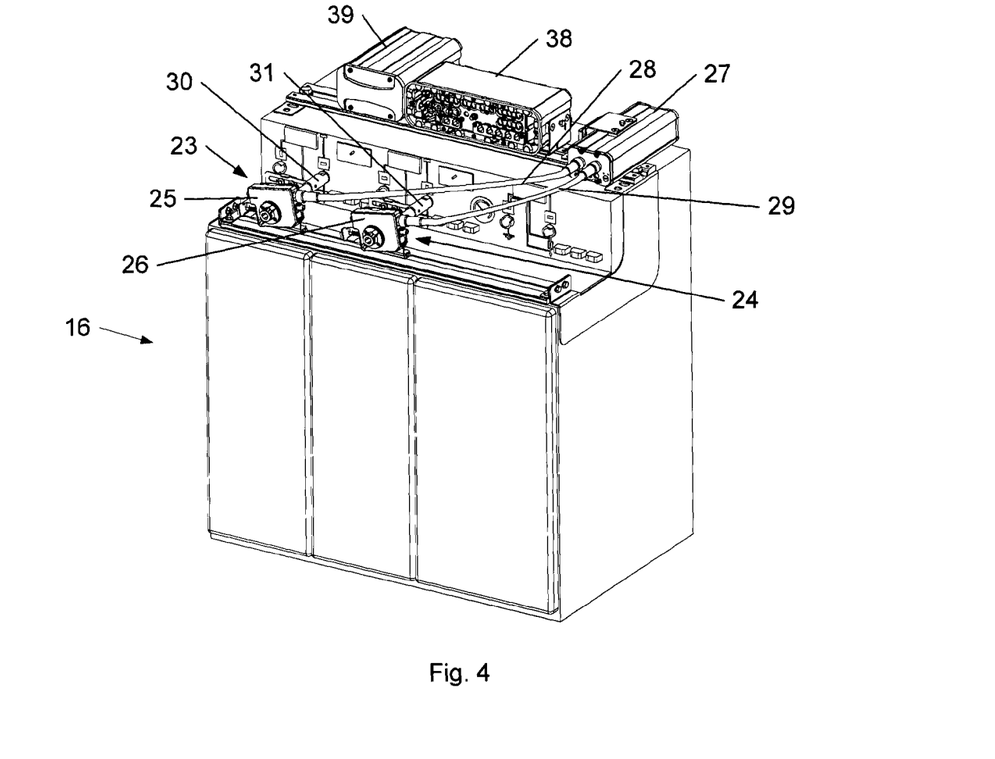
FIG. 4 shows the switchgear in FIG. 3 equipped with motor operators.

As illustrated in FIG. 4 the operating shaft for the mains switches of the switch gear 16 could be operated by motor operators 23,24 each comprising a housing 25,26 mounted on the switchgear 16. Further, the motor operators comprise electric motors located remotely in a separate control box 27 on top of the switchgear cabinet 17. Flexible connection shafts 28,29 interconnects the electric motors (in the separate control box 27) and the motor operators 23,24. The flexible connection shafts 28,29 are connected to the worm (not shown) of a worm gear in the motor operator 23,24. The worm wheels (nor shown) of the worm gear have a though hole, in which positioning elements 30,31 can be fitted. The positioning elements 30,31 engage with the operating shafts 18,19 (see FIG. 3) for the mains switches of the switchgear 16. When the electric motors are operated the positioning elements 30,31 will, via the flexible connection shafts 28,29 and the worm gear of the motor operators 23,24, be turned and thus be able to switch the mains switches of the switchgear 16.

The motor operators 9,10,23,24 will be described in greater details in FIGS. 7-12.

Figure 5:
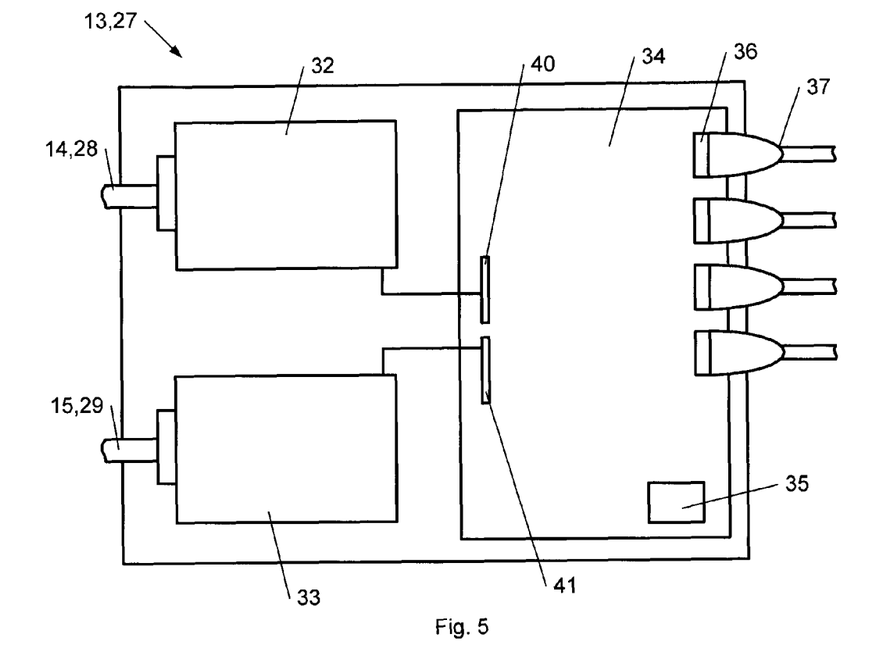
FIG. 5 shows an overview of the arrangement of the control box.

As can be seen from FIG. 5, showing an overview of the arrangement of the control box 13,27, the control box 13,27 contains the control system and the motors 32,33 for operating the switchgear 1,16. The control system includes a printed circuit board 34 with the power electronics to drive the motors 32,33, and a controller 35, preferably in the form of a microcontroller, which also features the interfacing with the overall control system of the switchgear. Equipped on the printed circuit board 34 are connectors 36 for attaching a supply of power to the system and for multipurpose inputs and outputs. The connectors 36 on the printed circuit board are placed adjacent to the wall of the cabinet of the control box 13,27 for easy plugging of power supply and interface cables 37 directly into the sockets through holes made from outside of the cabinet. One of the inputs is for receiving a potentiometer for determining the angle rotation of the operating shaft of the switchgear, which could be substituted by a magnetically based arrangement using a Hall-sensor. Another input in the form of a logical input to indicate if the positioning element is plugged correctly into the through hole in the worm wheel or not, is available. An input/output is also used for a multidirectional data bus for interfacing data with a remote control, via for example the communication module 38. If no mains power supply is available for the control box 13,26 and the communication module 38, power can be supplied from the battery 39. Although the switchgear 1 depicted in FIG. 2 is only illustrated with the control box 13, this could also comprise a communication module and battery as described above. For connecting the motors 32,33, the printed circuit board 34 is equipped with connectors 40,41 and allows easy and reliable electrical connection of the motors which are also placed internally in the cabinet of the control box 13,27. On the axles of the electric motors 32,33, flexible connection shafts 14,15,28,29 are mounted to drive the motor operators 8,9,23,24.

Figure 6:
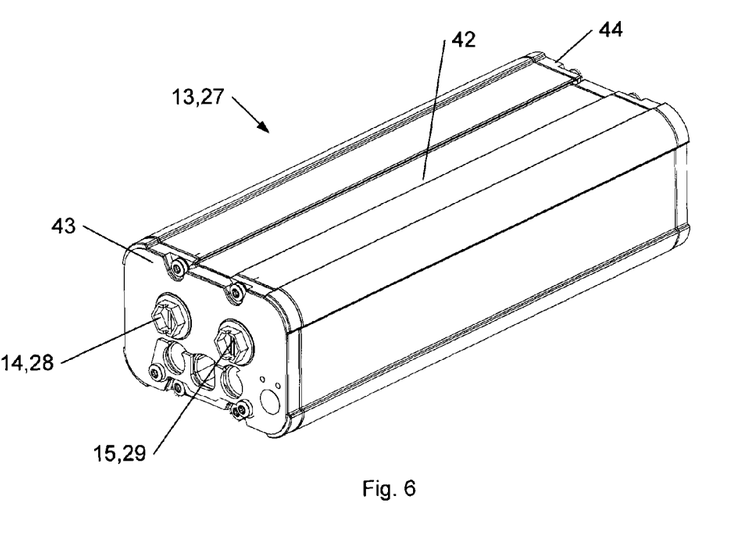
FIG. 6 shows a perspective view of the control box in FIG. 5.
Figure 7:
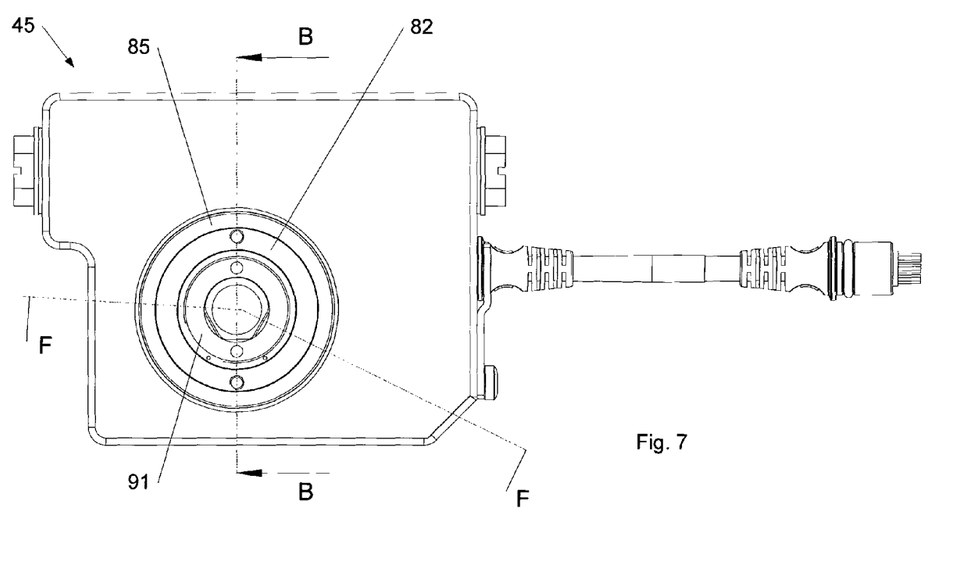
FIG. 7 shows a first embodiment of a motor operator seen from the front surface.
Figure 8:
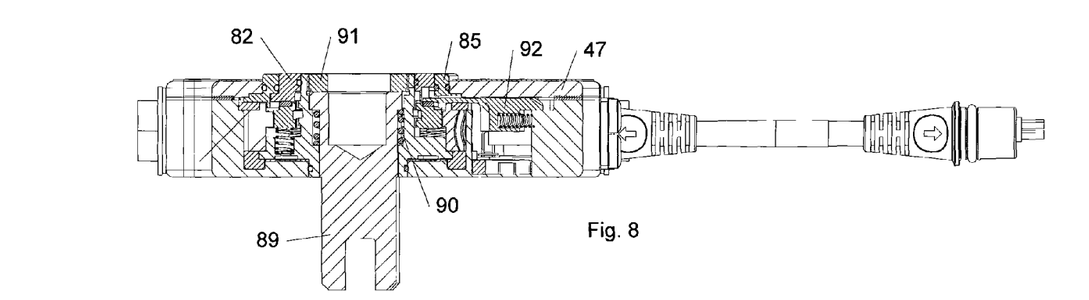
FIG. 8 shows a longitudinal section after line F-F in FIG. 7.
Figure 9:
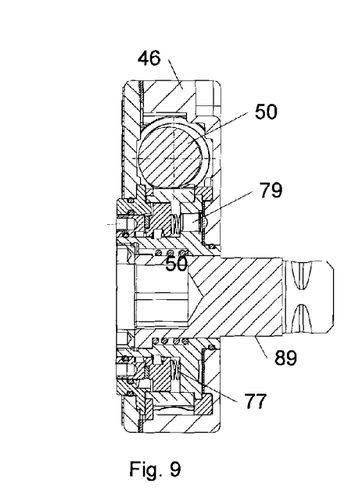
FIG. 9 shows a cross section after line B-B in FIG. 7.
Figure 10:
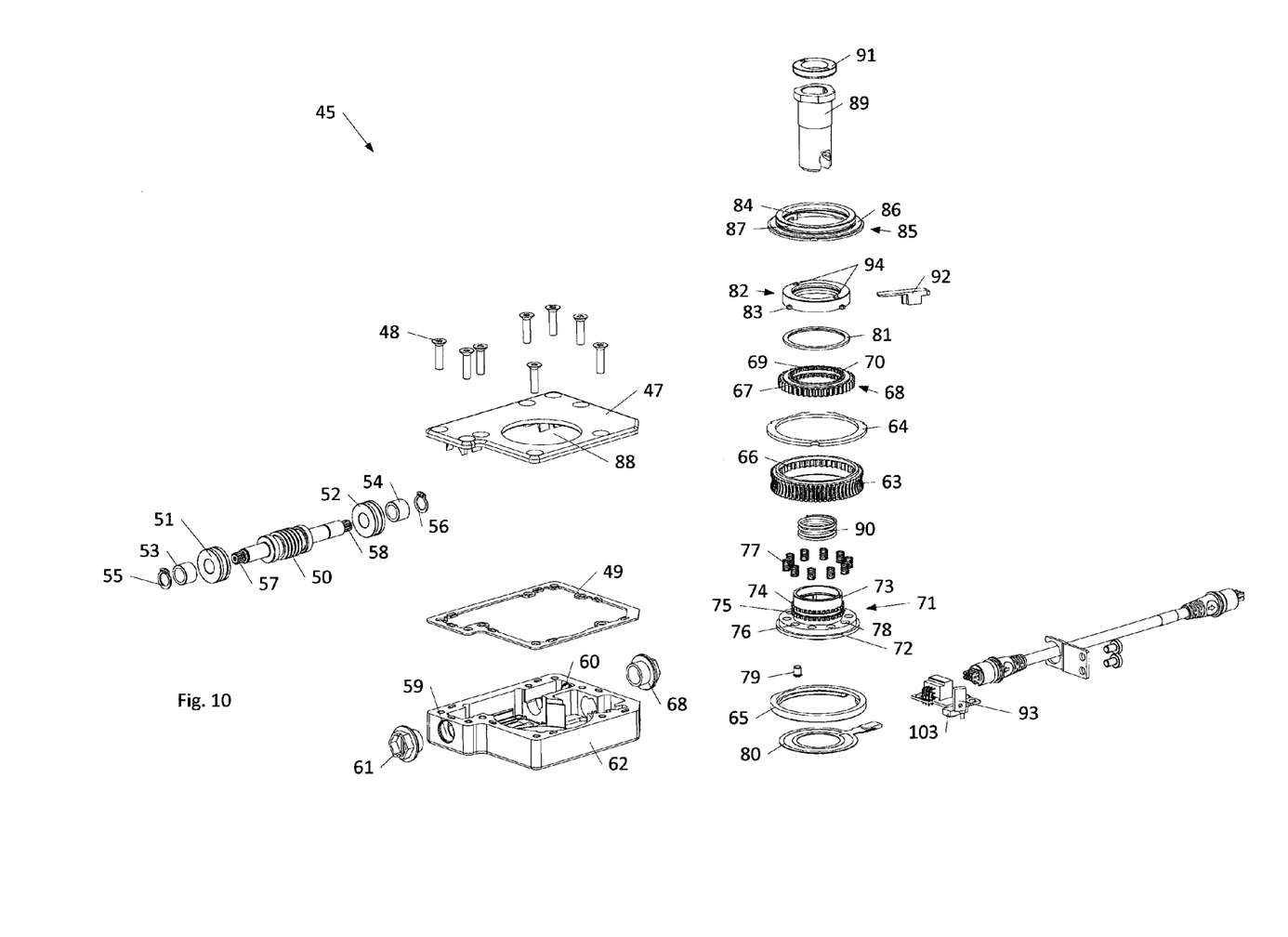
FIG. 10 shows an exploded view of the motor operator in FIGS. 6-8.

FIG. 6 shows a perspective of the control box 13,27 described in FIG. 5. The housing of the control box 13,27 consists of an elongated extruded aluminum tube 42, with a front cover 43 and rear cover 44, which is secured by means of screws, in each end of the tube. In the aluminum tube 42 is internally on both sidewalls formed a slot for fixing and positioning a printed circuit board 34 for the control system in its position in the control box 13,27. Similarly, the slot can be used for fixing a mounting frame for mounting the electric motor 32,33 in the control box 13,27. In a first end of the control box housing the motor axles are protruding and flexible axles 14,15,28,29 are mounted to those motor axles. In the distant second end of the housing the power- and interface cables 37 are connected. In a preferred embodiment the connectors are plugged directly into connection sockets on the printed circuit board, through ports made in the enclosure, preferably in the rear cover 44. It will be appreciated that the ports are equipped with means for protecting the control box 13,27 against intruding water or dust, in order to maintain a reliable functioning of the motor drive.

For further details on the construction and functionality of the control box 13,27 in FIGS. 5-6, reference is made to WO 2010/034313 to Linak A/S.

FIGS. 7-10 illustrate an embodiment of a motor operator 45, equal to the motor operators 9,10 illustrated in FIG. 2. The housing comprises a bottom part 46. The front cover 47 is attached to the bottom part 46 by means of screws 48 and with a gasket 49 for water and dust proofing purposes. In the bottom part 46, there is a worm 50 having at both ends a ball bearing 51,52 and radial bearing 53,54 kept in position by means of locking springs 55,56. The shaft ends of the worm 50 are designed with a spline connection 57,58 for receiving an end of the flexible connection shaft (see reference numerals 14,15,28,29 in e.g. FIGS. 2 and 4). The ends of the worm 50 are available through apertures 59,60 in the sidewall of the bottom part 46. The apertures 59,60 can be closed by means of plugs 61,62. Accordingly, one may freely choose to connect the flexible connection shaft (see reference numeral 14,15,28,29 in e.g. FIGS. 2 and 4) at either end of the worm 50. The worm 50 is in mesh with a worm wheel 63 arranged between a bushing top 64 and bushing bottom 65.

The worm wheel 63 comprises a toothed rim 66 on the inner circumference, which is in mesh with the outer toothed rim 67 of a connection part 68 arranged in the opening of the worm wheel 63. The connection part 68 is essentially a toothed wheel, where the inner circumference comprises two uniformly shaped toothed rims 69,70, arranged at a mutual distance relative to the longitudinal axis of the connection part 68. Inside the opening of the connection part 68 a driver 71 is arranged. The driver 71 comprises a circular plate element 72 and a tube-shaped shoulder 73 extending there from. The outer circumference of the tube-shaped shoulder 73 comprises two uniformly shaped toothed rims 74,75, which are in mesh with the toothed rims 69,70 of the connection part 68. The toothed rims 74,75 are arranged at a mutual distance relative to the centre axis of the driver 71. The side of the circular plate element 72 facing the shoulder 73 comprises a number of apertures 76, which each can receive and carry a spring 77 (for the sake of simplicity only one aperture and one spring is referenced). The circular plate element 72 further comprises a through hole 78, in which a spring plunger 79 is inserted. The spring plunger 79 comprises a spring loaded ball which is pressed against the potentiometer 80 placed at the bottom of the bottom part 46. The potentiometer 80 can via the PCB (printed circuit board) assembly (not referenced) be connected to the control box 13,27. The potentiometer 80 detects the angle position of the driver 71.

The connection part 68 rests on the springs 77. Separated by a washer 81, the connection part 68 carries a release part 82 embodied as an annular ring. The release part 82 comprises three protrusions 83 (only one is referenced) at the lower end of its outer circumference. Each of the protrusions 83 are in mesh with guides 84 (only one is referenced) of a fixing ring 85. The release part 82 comprises a hollow circular plate element 86 from which a tube shaped shoulder 87 extends. The guides 84 are placed on the inner circumference of the fixing ring 85. The bottom of the circular plate element 86 of the fixing ring 85 rests on the bushing top 64. The top of the circular plate element 86 and the outer circumference of the tube shaped shoulder 87 of the fixing ring 85 are fixed against the opening 88 of the front cover 47.

The positioning element 89 is inserted in the opening of the driver 71 for coupling the motor operator 45 to the operating shaft of the switchgear. In order to ease the removal of the positioning element 89, it is led through a spring 90 which rests on a recess (not referenced) in the driver 71. The positioning element 89 is retained in the driver 71 by a fixing part 91 comprising a thread (not referenced) for screwing the fixing part 91 into the driver 71. Thus, the driver 71 comprises a corresponding thread (not referenced) on the inner circumference of the tube shaped shoulder 73. The top surface of the fixing part 91 is approximately aligned with the top end surface of the tube shaped shoulder 73 of the driver 71. When inserting and fixing the positioning element 89 in the driver 71 as described, the spring 90 is compressed. By removing the fixing part 91, the spring 90 will cause the positioning element 89 to be pushed partly out of the driver 71.

During normal operation of the motor operator the toothed rims 69,70 of the connection part 68 are in mesh with the toothed rims 74,75 of the driver 71, respectively. If it is required to operate the operating shaft of the switchgear manually, this can be done either by using the positioning element 89 or by removing the positioning element 89 and thereby gain direct access to the operating shaft of the switchgear. This, however, requires that the positioning element 89 is decoupled or released from the worm gear (worm 50 and worm wheel 63), which is self-locking. This is done by turning the release part 82, whereby the protrusions 83 are led from a first end position of the guides 84 of the fixing ring 85 to a second end position of the guides 84. Hereby, the release part 82 is moved in a direction towards the bottom of the bottom part 46. This causes the connecting part 68 to move in the same direction, whereby the springs 77 are compressed. The two uniform tooted rims 69,70 on the connecting part 68 are hereby brought out of mesh with the two uniform toothed rims 74,75 of the driver 71. The driving connection between the driver 71 and the worm wheel 63 via the connecting part 68 is thereby disconnected. The positioning element 89 is thus released, enabling the mains switch of the switchgear to be operated manually using the positioning element 89 or by removing the positioning element 89 so as to gain direct access to the operating shaft of the switchgear. For some types of switchgears it is necessary to remove the positioning element 89 so as to be able to earthen the switchgear. Hence by removing the positioning element 89 it is possible to move a sliding bar so that it covers the hole 5,6 to the operating shaft of the switchgear. By doing so access to the operating shaft for earthing is gained through the hole 7,8.

The motor operator 45 can be reconnected by turning the release part 82 back. Hereby the protrusions 83 of the release part 82 are moved from the second end position and back to the first end position of the guides 84 of the fixing ring 85. The springs 77 will ensure that the connecting part 68 follows the displacement of the release part 82, and thereby assist in bringing the toothed rims 69,70 of the connecting part 68 in mesh with the toothed rims 74,75 of the driver 71.

The motor operator 45 comprises a spring loaded slider 92, which is embodied as an elongated element being brought into engagement with a guide (not illustrated) in the outer circumference of the release part 82 via a recess in the fixing ring 85. The guide of the release part 82 extents along a part of the circumference (circular arc) and has a length essentially corresponding to the length of the guides 84 of the fixing ring 85. The depth of the guide of the release part 82 decreases from a first end position to a second end position. The first and second end positions of the guide of the release part 82 are adapted to the first and second end positions of the guide 84 of the fixing ring 85. Thus when the protrusions 83 of the release part 82 are in the first end position of the guide 84 of the fixing ring 85, the spring loaded slider 92 is located in the first end position of the guide of the release part 82. When the release part 82 is turned such that the protrusions 83 are moved to the second end position of the guide 84 of the fixing ring 85, the spring loaded slider 92 is likewise moved along the guide of the release part 82 to the second end position thereof. Due to the decrease of the depth of the release part 82 guide 84, the spring loaded slider 92 has been moved backwards (in a direction away from the release part 82) when it reaches the second end position, whereby a switch 93 on the PCB (printed circuit board) assembly (not referenced) is triggered. This generates a signal which is registered by the control box 13,27 (see e.g. FIGS. 5 and 6).

The turning of the release part 82 can be done by inserting a tool in openings 94 on the top surface of the release part 82.

The release part 82 could also be connected to a wire, e.g. placed inside the housing of the motor operator 45. The wire could be connected to a turnable knob.

Figure 11:
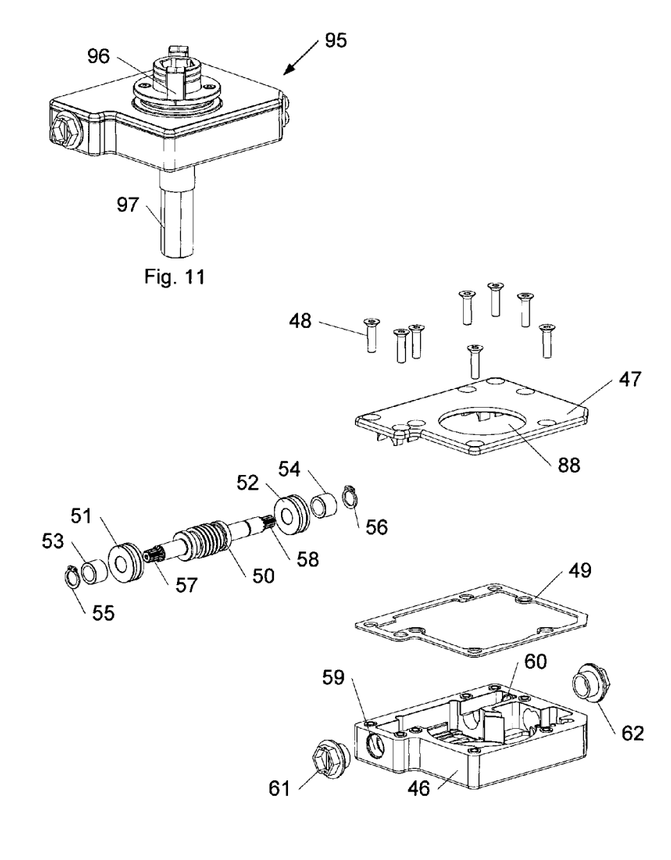
FIG. 11 shows a perspective of a second embodiment of a motor operator.
Figure 12:
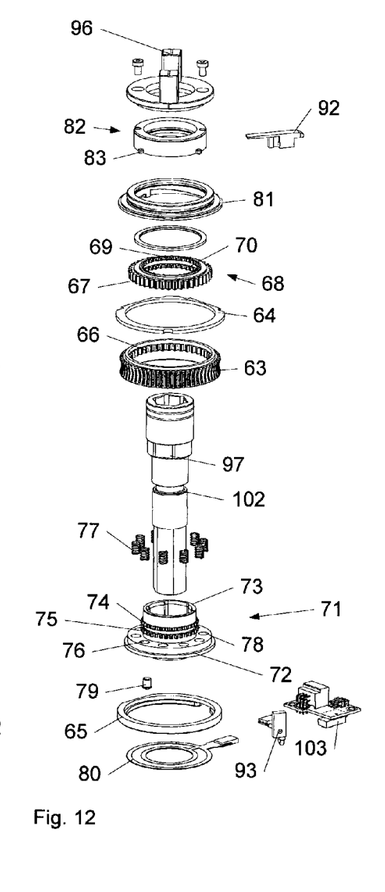
FIG. 12 shows an exploded view of the motor operator in FIG. 11.

FIGS. 11-12 illustrate another embodiment of the motor operator 95. In terms of structure and function, this motor operator 95 is very similar to the motor operator 45, but differs as described in the following. The fixing part is replaced with a knob 96 fixed directly to the release part 82. When it is required to operate the operating shaft of the switchgear manually, this can be done simply by turning the knob 96, whereby the release part 82 is pushed towards the bottom part 46. The motor operator 95 further differs in that the positioning element 97 is different from the one comprised by the motor operator 45. The positioning element 97 is retained in the switchgear 95 by the knob 96.

Figure 13:
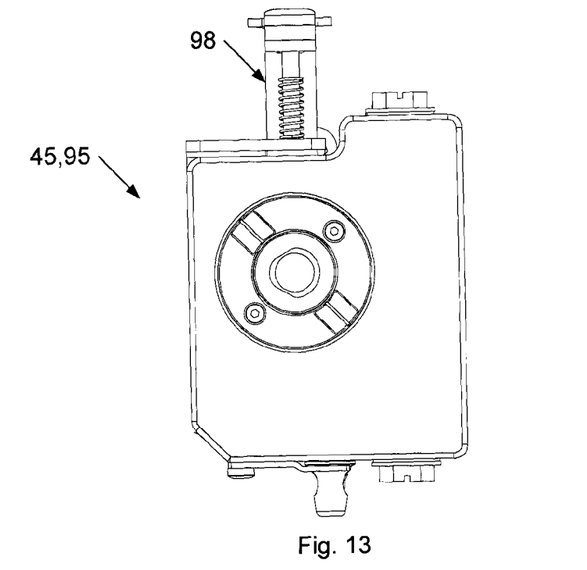
FIG. 13 shows a front view of a motor operator comprising a locking device.
Figure 14:
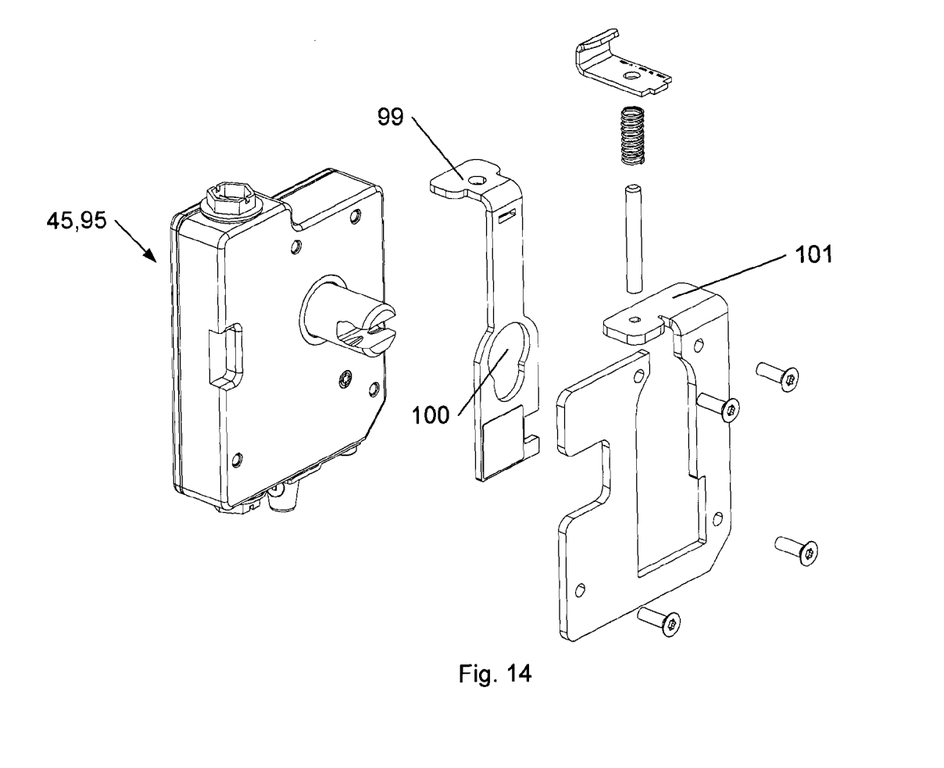
FIG. 14 shows a rear perspective of a motor operator comprising a locking device, where the latter is illustrated in an exploded view.

The motor operator 45,95 can further comprise a locking device 98 for securing and registering the position of the positioning element 89,97 in the motor operator 45,95 (see FIGS. 13 and 14). The locking device 98 is fastened to the outer surface of the bottom plate 46 facing the switchgear. The locking device comprises a spring loaded slider 99 having a keyhole-shaped through hole 100. The spring loaded slider 99 is fixed to a holder 101. When positioning element 87, 97 is inserted correctly in the motor operator 45,95, the lower part of the keyhole-shaped through hole 100 fits into a recess 102 (see FIG. 12) of the positioning element 97. Hence if the positioning element 89,97 is inserted incorrectly, the slider 99 cannot slide in an upwards direction. The sensor 103 on the printed circuit board of the motor operators 45,95 can detect the position of slider 99 and thereby detect whether the positioning element 89,97 is inserted correctly into the motor operator 45,95. If this is not the case the control box 13,27 will prevent any operation of the motor operator 45,95.

The invention claimed is:

1. An actuator comprising:
a positioning element (89,97,
an electric motor (32,33), and
a transmission (50,63),
wherein the positioning element (89,97) is driven by the electric motor (32,33) via the transmission (50,63),
two toothed wheels (68, 71) which by mutual displacement can be brought out of mesh with each other for disengagement of the positioning element (89,97), wherein the two toothed wheels (68, 71) each comprises at least two toothed rims (69,70;74,75) positioned with a spacing corresponding to at least the width of a toothed rim (69,70,74,75), wherein the two toothed rims (69,70;74, 75) of each of the toothed wheels (68, 71) are adapted to mesh with each other, and wherein the two toothed rims (69, 70;74,75) of each of the toothed wheels (68,71) can be brought out of mesh with each other by axial displacement of at least one of the toothed wheels (68,71) relative to the other toothed wheel (68,71).

2. The actuator according to claim 1, embodied as a motor operator (9,10,23,24,45,95) for a switchgear (1,16) for mains power distribution systems, the switchgear (1,16) comprising:
a cabinet (2,17) with at least one operating shaft for at least one mains switch located inside the cabinet, the operating shaft having a coupling part (18,19) accessible on a front surface (4,20) of the cabinet (2,17) and the operating shaft being rotatable between at least two positions namely corresponding to a closed and an open position of the mains switch, the motor operator (9,10,23,24,45, 95) comprising:
a housing (11,12,25,26) having a front surface and rear surface and side surfaces connecting the front and rear surfaces,
the positioning element (87,97) comprising a first and second end the first end being intended for engagement with the coupling part (18,19) of the operating shaft of the switchgear (1,16), the positioning element (89,97) is arranged in an opening in the front surface of the housing (11,12,25,26),
the toothed wheels of the transmission comprises a first toothed wheel (71) for driving the positioning element (89,97), a second toothed wheel (68) in mesh with the first toothed wheel (71), where the second toothed wheel (68) is in driving connection with the electric motor (32,33),
the first toothed wheel (71) can be displaced relative to the second toothed wheel (68) or vice versa, such that the first wheel (71) can be brought out of mesh with the second toothed wheel (68), whereby the driving connection with the electric motor (32,33) is interrupted.

3. The actuator according to claim 1, wherein the toothing on the two toothed rims (69,70;74,75) is uniformly distributed and is designed with a rectilinear face.

4. The actuator according to claim 1, wherein at least one toothed wheel (68,71) is in engagement with a release part (82), which when turned can be displaced between a first position and a second position.

5. The actuator according to claim 4, wherein the release part (82) comprises at least one protrusion (83) engaging with at least one guide (84) of a fixing ring (85), where each end of the guide (84) has a resting portion corresponding to the first and the second position, respectively.

6. The actuator according to claim 1, wherein the actuator comprises at least one spring arranged between the first toothed wheel (71) and the second toothed wheel (68), such that the first toothed wheel (71) is spring loaded relative to the second toothed wheel (68).

7. The actuator according to claim 1, wherein the release part (82) is coupled to a detection device (80) for detecting the position of the release part (82) relative to the fixing ring (85).

8. The actuator according to claim 1, further comprising a locking device (98) for securing and registering whether the positioning element (89,97) is positioned correctly in the motor operator (9,10,23,24,45,95).

9. The actuator according to claim 1, wherein the transmission comprises a worm gear comprising a worm (50) and a worm wheel (63).

10. The actuator according to claim 1, comprising a sensor to determine the angle of rotation of the first toothed wheel (71).

* * * * *